Dec. 1, 1931.  F. KOCH  1,834,404
PIPE SUPPORTING BRACKET
Filed July 26, 1928  2 Sheets-Sheet 1

INVENTOR
Felix Koch,
by J. O. Laube
Atty.

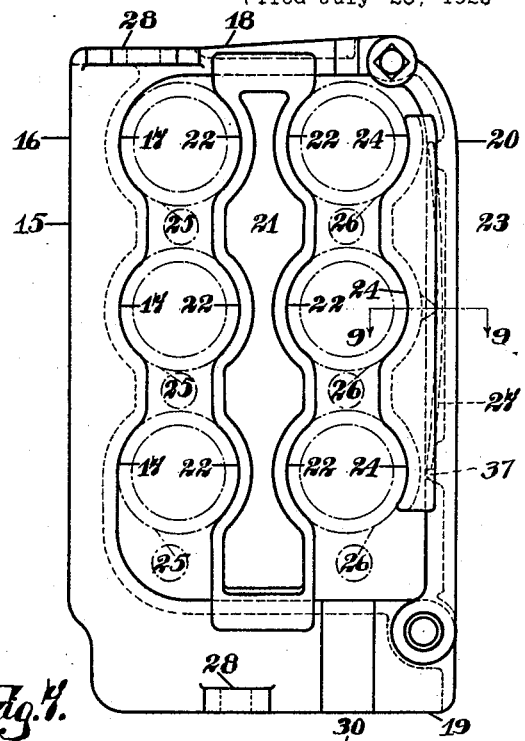
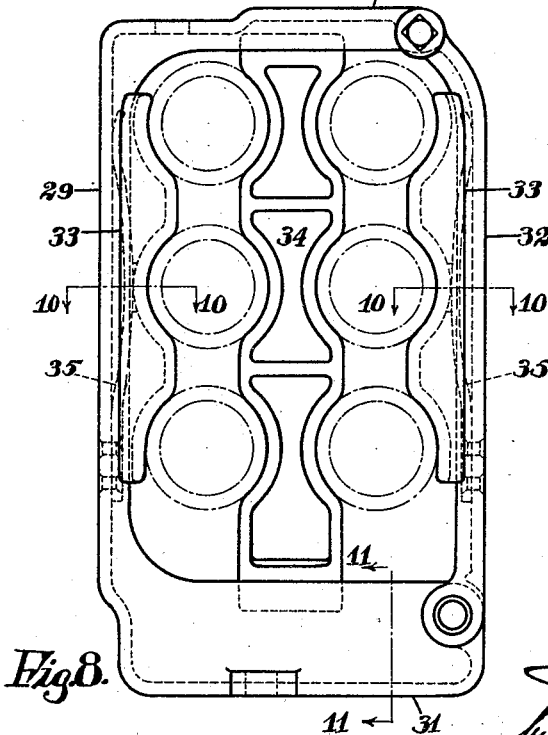
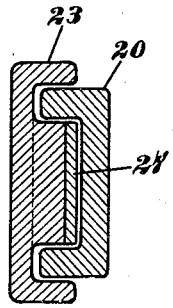
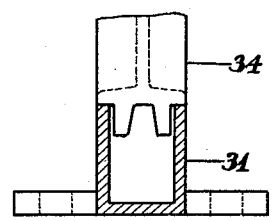
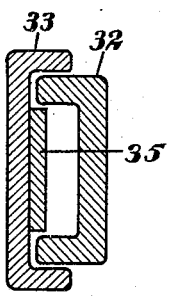

Patented Dec. 1, 1931

1,834,404

UNITED STATES PATENT OFFICE

FELIX KOCH, OF BELLEVUE, PENNSYLVANIA, ASSIGNOR TO PRESSED STEEL CAR COMPANY, OF PITTSBURGH, PENNSYLVANIA, A CORPORATION OF NEW JERSEY

PIPE SUPPORTING BRACKET

Application filed July 26, 1928. Serial No. 295,407.

An object of my invention is to provide a pipe supporting bracket, such as for heater pipes in a railway car, that will maintain the various pipes in alignment, prevent the rattling of the pipes when the car is in motion and allow free movement of the pipes during expansion and contraction.

Another object of my invention is to provide a pipe bracket with resilient means for holding the pipes against vibration.

Another object of my invention being to provide a hinged or removable side to make the brackets more accessible for assembling.

Figure 3:
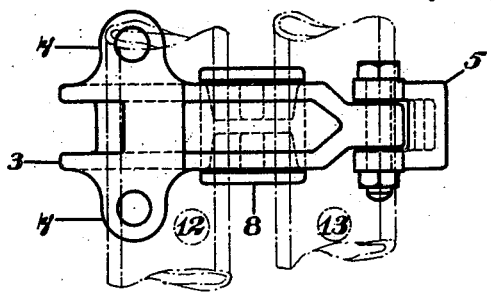
Figure 5:
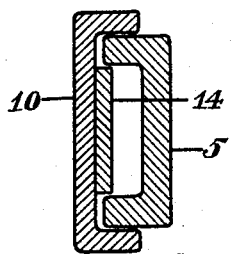
Figure 1:
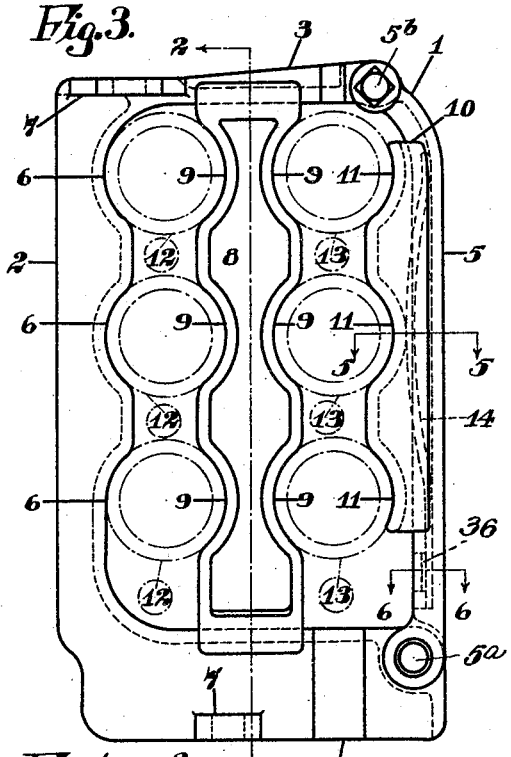
Figure 2:
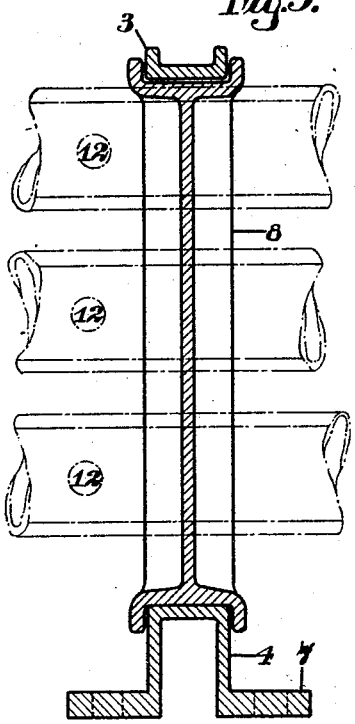
Figure 4:
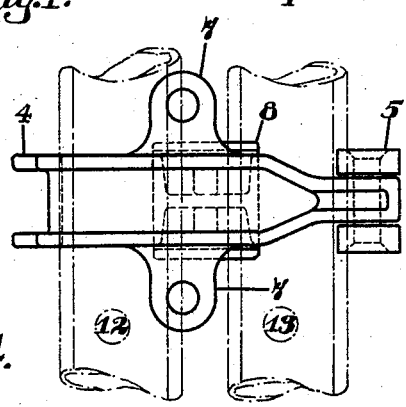
Figure 6:
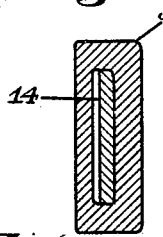

Referring to the drawings, Fig. 1 is a view showing the bracket in elevation and a method of assembling the pipes; Fig. 2 is a section taken along the longitudinal center line 2—2 of Fig. 1; Figs. 3 and 4 are plan views showing the top and bottom of the bracket and the means for attaching the bracket to the car; Figs. 5 and 6 are sections taken along the lines 5—5 and 6—6 through the hinged side of the bracket; Figs. 7 and 8 are modifications of the invention as illustrated in Fig. 1; Figs. 9 and 10 are sections through the resilient member along the lines 9—9 and 10—10 of Figs. 7 and 8; Fig. 11 is a section through the bottom member of the bracket along the lines 11—11 of Fig. 8.

Referring now in detail to the bracket as illustrated in Fig. 1 of the drawings, reference character 1 indicates a pipe supporting bracket having a rigid frame comprising a fixed side 2, top 3, bottom 4 and a hinged side 5. On the interior of the bracket and arranged longitudinally of the side 2 are a plurality of pipe seating surfaces which are adapted to engage a portion of a pipe which is less than one-half the circumference thereof. The top portion 3 of the bracket is made integral with one end of the side 2 and the bottom 4 of the bracket is made integral with the lower end of the side 2. Each of the portions 3 and 4 have flanges 7 near the ends adjacent the side 2, which are provided with suitable openings to receive fastening members for attachment to the car body. The other ends are reduced in width to engage with the hinged side 5 which completes the frame of the bracket. The hinged side 5 is bifurcated at each end, one end being fastened by a pin 5ª to the bottom 4 to form a hinge joint and the other end being fastened by a removable pin 5ª to the top 3 of the bracket.

Interiorly of the bracket is a seating member 8 having a plurality of seating surfaces 9 each of which is adapted to embrace a pipe for a portion less than one-half the circumference thereof. Each end of the member 8 is bifurcated to engage the top and bottom portions 3 and 4 of the bracket which act as guides to permit movement transversely of the bracket and pipes and to prevent movement longitudinally of the pipes. The member 8 acts as a support for the pipes embraced by it and is in turn supported by bearing on the portion 4 of the bracket frame. Along the hinged side 5 and interiorly of the bracket is a seating member 10 which has a plurality of seating surfaces 11 longitudinally of the member and is arranged to span a plurality of pipes. The side of the member 10 opposite the seating surfaces is bifurcated and when engaging the member 5 between the bifurcations has a movement limited in direction longitudinal of the member 5.

When the pipes are assembled in the bracket, as illustrated by Fig. 1, with the pipes 12 contained between the seats 6 and 9 of the members 2 and 8, the pipes 13 contained between the seats 9 and 11 of the members 8 and 10 and the hinged side 5 is in closed position, the pipes 12 and 13 would be held only against vertical displacement. If the engagement between the pipes and pipe seats was sufficiently free to permit longitudinal and transverse movement of the pipes under expansion, the pipes would rattle when the car was in motion, and if the pipes were held firmly enough to prevent the rattling, the free movement during expansion would be prevented. To overcome this condition a curved flat bar spring 14 is inserted between the member 10 and the side 5 within the bifurcated portion of the member 10. The ends of the spring 14 are made to bear on the member 5 and the raised central portion bears against the member 10. One end of the spring 14 is held within a slot 36 in the member 5 to prevent the spring from becoming detached and lost when the hinged side 5 is open to insert or remove the pipes 12 and 13.

It will now be obvious that in order to close the bracket side 5 the spring 14 must be slightly compressed, and in so doing the members 8 and 10 will be forced into close contact with the pipes, which will prevent undue movement between the pipes and the pipe seats when the car is in motion. The pipes when heated and expanded will further compress the spring 14 to permit longitudinal and transverse movement of the pipes. Thus the pipes will at all times be held in place by a resilient force which will permit movement of the pipes in a longitudinal and transverse direction during expansion, but will prevent undue vibration between the pipes and their seats, the members 8, 10 and the frame 1.

The modification of the invention as shown by Fig. 7 has a frame 15 comprising a fixed side 16 having a plurality of pipe seats 17 and top and bottom members 18 and 19 formed integral therewith. The members 18 and 19 have flanges 28 near the ends joining the side 16, which have suitable openings therein to receive fastening means for attaching the bracket to the car body. The remaining ends of the members 18 and 19 are reduced in width to receive the bifurcated ends of the hinged side 20. The seating member 21 within the bracket has bifurcated ends engaging the top and bottom portions of the frame and functions the same as described in Fig. 1. The seating member 23 adjacent the hinged side 20 is the same as previously described for the similar member in Fig. 1, excepting for the resilient member 27. In this embodiment of the invention the spring is fixed at both ends against stops 37 on the member 20 but is free to bend in the middle under pressure and to hold the pipes and seating members together but free to move under expansion.

The modification of the invention as shown by Fig. 8 has a rigid frame comprising a fixed side 29 with top and bottom members 30 and 31 formed integral therewith and a hinged side 32. Neither side has seats formed integral therewith but has separate seating members 33 adjacent thereto with resilient means in the form of springs 35 between the side and seating member for holding the pipes in their seats. The central seating member 34 has seats formed on each side and moves in the bifurcated sides of the members 30 and 31. Otherwise the mode of assembling the pipes in the bracket and the action of the various parts is the same as previously described for Fig. 1.

Having thus described the invention what I claim as new and desire to secure by Letters Patent is:

1. A pipe bracket comprising a supporting frame having a hinged side, seats for pipes in one side of said frame, a laterally movable seating member within the frame and a resilient member between said laterally movable seating member and one side of said frame, said resilient member holding the pipes between said seating surfaces to prevent movement longitudinally of the seating member but permitting movement of said pipes during expansion.

2. In a pipe bracket, the combination of a rigid frame, a movable side on said frame, members having a plurality of seating surfaces within said frame, resilient means between said members and sides of frame, said resilient members holding said pipes in place between said seating members while permitting longitudinal expansion of the pipes.

3. The combination in a bracket for holding a series of pipes in spaced alignment, of a rigid support frame, a plurality of spaced seating members each having a plurality of pipe seats, resilient means between said seating members and frame sides and a removable side on said frame.

4. The combination in a pipe bracket of a supporting frame, means within said frame for holding a plurality of pipes in spaced alignment against independent movement laterally and transversely of said frame, resilient means between one of said spacing means and a side of said frame, said resilient means extending across a plurality of pipes for permitting transverse and longitudinal expansion of said pipes.

5. A pipe bracket maintaining a plurality of spaced pipes in vertical and transverse alignment comprising a rigid frame, pipe engaging seating members at each side of said frame, a supporting member having a plurality of pipe seating members within said frame and movable transversely thereof, and resilient means between said side pipe seating members and the side of said frame.

6. The combination in a pipe bracket of a rigid frame, pipe seating members at the side of said frame, a member within the frame and movable laterally thereof supporting said pipes in vertical alignment and maintaining the pipes in said side seating members and resilient means between said side pipe seating members and frame side.

7. In a pipe supporting bracket frame in combination, spaced pipe seating surfaces in one side of said frame, a member mounted within said frame and movable transversely thereof and having spaced pipe seating surfaces at each side thereof, a member mounted adjacent the other side of said frame having spaced pipe seating surfaces, pipes supported between the seating surfaces of said members and a resilient member between said side member and the adjacent side of said frame.

8. In a pipe supporting bracket in combination, a rigid frame having a side thereof hinged to open outwardly, spaced pipe seating surfaces in one side of said frame, a member mounted adjacent the transversely opposite side of said frame and having spaced pipe seating surfaces on one side thereof, a member movably mounted within said frame intermediate said sides and having spaced pipe seating surfaces at each side thereof and in alignment with the adjacent seating surfaces at the sides of the frame, pipes supported between the pipe seating surfaces of said members and a resilient member between a side of said frame and the adjacent side seating member.

9. In a pipe supporting bracket frame in combination, members mounted at transversely opposite sides of said frame, spaced pipe seating surfaces on said members, a member movably mounted within said frame, intermediate said members, and having spaced pipe seating surfaces at opposite sides thereof, pipe supported between the opposing pipe seating surfaces and a resilient member between one of said side members and the adjacent side of said frame.

In testimony whereof I affix my signature.

FELIX KOCH.